June 27, 1944.  J. H. KARLSON  2,352,205
DRINK MIXING TUMBLER
Filed Aug. 2, 1940   2 Sheets-Sheet 1
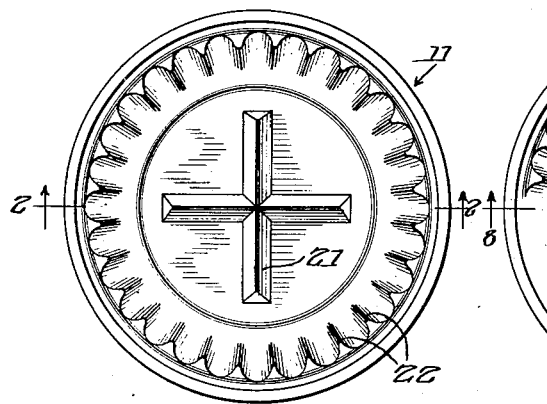
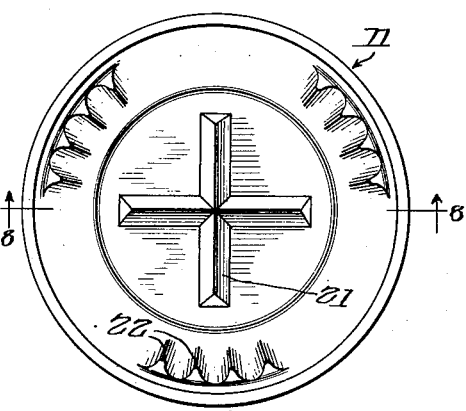
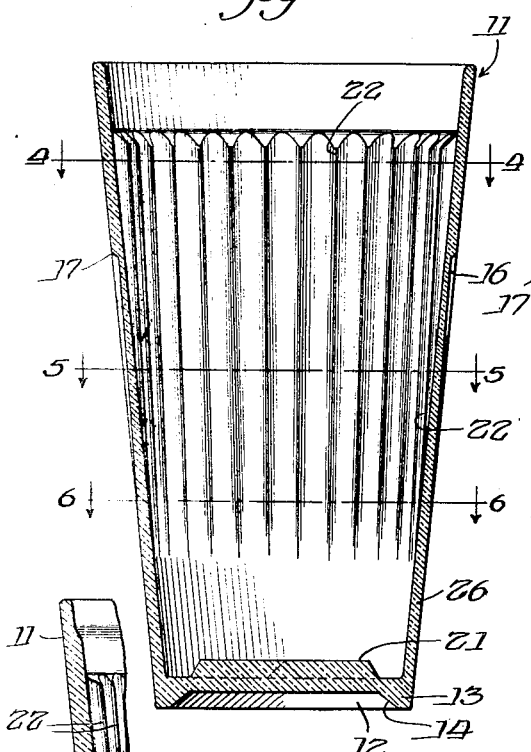
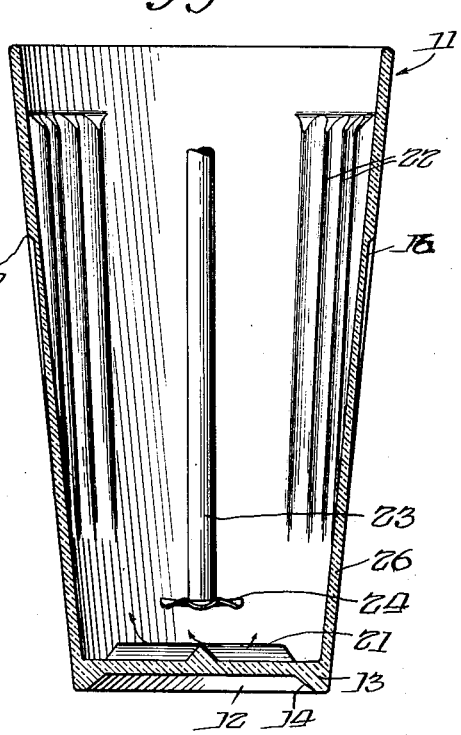
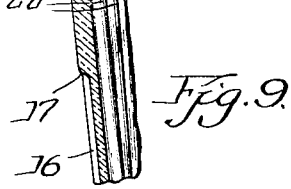
Inventor:
Julius H. Karlson
By Mann, Brown & Co.
Attys

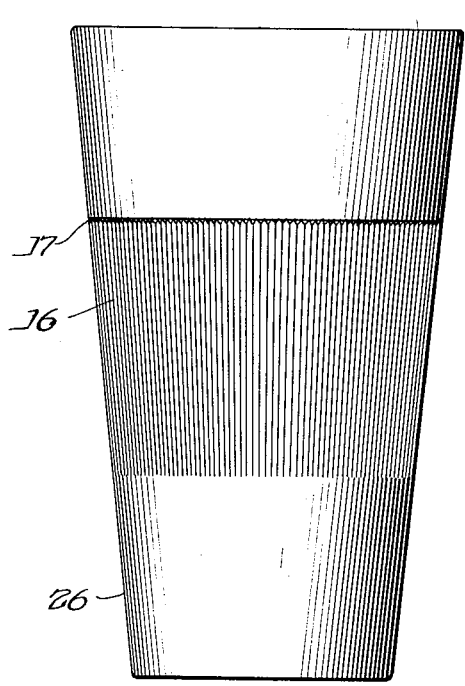
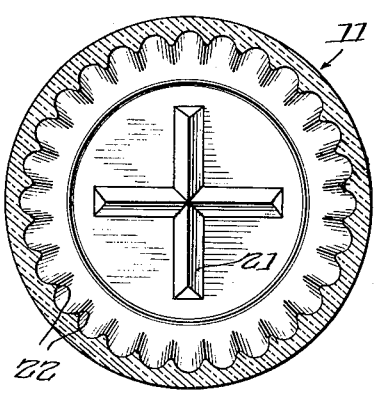
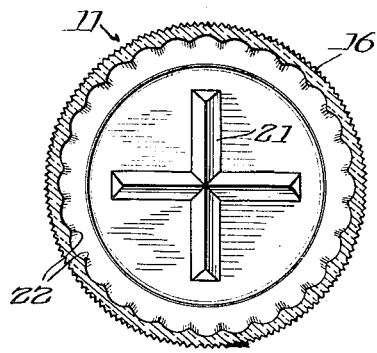
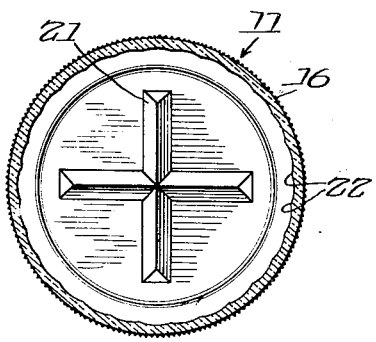

Patented June 27, 1944

2,352,205

UNITED STATES PATENT OFFICE 2,352,205

DRINK MIXING TUMBLER

Julius H. Karlson, Chicago, Ill.

Application August 2, 1940, Serial No. 349,494

9 Claims. (Cl. 259—107)

The chief problem in drink mixers for mixing milk shakes and the like is to break up or cut up the lump of ice cream quickly and thoroughly. Not only is speed desirable for enabling one machine to handle a large number of milk shakes per hour, but it is also desirable in order to produce as little heating of the drink as possible.

In conventional drink mixers of this type, a large tumbler is partially filled with the ice cream and the liquid with which it is to be mixed and is then put on the mixer with the agitator of the mixer extending down into the tumbler close to the bottom thereof and rotating at rapid speed. The agitator has at its bottom and sometimes also a little ways above its bottom, an impeller disk which may be corrugated or otherwise roughened so that it will bite into the ice cream and will also act to a slight extent as a centrifugal pump. Thus it will not only break up the ice cream in its immediate vicinity, but it will impel the liquid mixture outwardly against the slanting side walls of the tumbler by which it is deflected upwardly. Air will be drawn down in the vortex so that the mixture will be whipped.

The rotating impeller rotates the entire mass of liquid and ice cream. It has been recognized that this is objectionable if the rotation of the mass is fast enough to cause it to slop over at the sides due to centrifugal force. This effect has been minimized by providing two or three vertically extending ribs along the inside of the side wall of the tumbler which would serve to slow down the rotation enough so that liquid would be a little less likely to wash over than before. It has generally been the practice to put so little material into the mixing tumbler that it would be nowhere near full after the mixing process had whipped up the liquid. The mixed drink would then be poured into a smaller glass for serving so as to present a full glass to the customer.

According to the present invention, relatively sharp ribs are provided all around the circumference of the glass with two very desirable results, first the rotational speed of the liquid is slowed down sufficiently so that enough material may be placed in the glass to make it seem adequately filled after mixing without having this material wash over the sides, and secondly the speed of mixing is considerably increased. This is due to the combined effects of slowing down the rotation of the mixture so that the agitator gets a better bite thereon, and the abrasive effect of the relatively sharp ribs.

A fairly good speed of the mixture has been considered desirable so as to insure adequate circulation of the ingredients being mixed. The apparently irreconcilable requirements have been reconciled according to the present invention by tapering the ribs so that they project prominently near the top of the tumbler where it is most necessary to retard the rotation of the mixture, while being very slight below the center of the tumbler where the rotational effect is necessary to insure upward movement of the mixture along the sides of the tumbler.

Although tumblers have been made heretofore of both metal and glass, it is preferred to make this tumbler of glass for the sake of appearance and sales appeal and so that the operator can tell when the ingredients have been adequately mixed. By making the ribs relatively narrow and steep, they not only have a better abrasive action on the ice cream, but they also facilitate annealing. Furthermore, they present a more attractive appearance than wide ribs and, in fact, are highly decorative. Closely spaced vertical ribs are also provided around the outside of the tumbler to prevent its slipping out of the hand when wet.

According to another feature of the invention, a rib formation, such as a cross, is provided in the bottom of the tumbler upstanding from the bottom, so as to have an abrasive and deflecting effect on the ingredients below the agitator. This has been a very troublesome zone heretofore, being a pocket in which there may be very little circulation. Quite often a cake of ice cream has remained intact below the agitator after all the ice cream above it had been broken up.

Additional objects and advantages of the invention will become apparent from the following description and from the drawings, in which Fig. 1 is a plan view of the preferred form of tumbler made in accordance to this invention;

Fig. 2 is a vertical section taken on the line 2—2 of Fig. 1;

Fig. 3 is a side view of the embodiment shown in Figs. 1 and 2;

Fig. 4 is a horizontal section approximately on the line 4—4 of Fig. 2;

Figs. 5 and 6 are of similar sections taken on the lines 5—5 and 6—6 of Fig. 2;

Fig. 7 is a view similar to Fig. 1, but showing a modification of the invention having fewer ribs;

Fig. 8 is a vertical section taken on the line 8—8 of Fig. 7 and showing an agitator in motion in the tumbler to illustrate particularly the action of the bottom ribs; and Fig. 9 is a fragmentary view similar to Fig. 2, but showing a little more exactly the details of shape of a tumbler which has actually been manufactured and found to be satisfactory.

Two forms of the invention have been chosen for illustration and description in compliance with section 4888 of the Revised Statutes, but persons skilled in the art will readily perceive other means for accomplishing the same results and the claims are therefore to be construed as broadly as possibly, consistent with the prior art.

The two forms of the invention are so similar that the same reference characters will be used throughout, it being understood that the form shown in Figs. 7 and 8 is different from the other form only by virtue of omitting approximately half of the internal vertical ribs.

The tumbler as a whole is designated by the reference numeral 11 and in general outlines is similar to conventional tumblers. At present it is being made in approximately the same size as conventional drink mixer tumblers so as to fit the conventional machines. It is important that it be the right height for these machines inasmuch as some of the machines are turned on automatically by the upper edge of the tumbler, as the tumbler is applied to the machine. The tumbler is also provided with a relatively deep recess 12 at its bottom to form a relatively heavy flange 13 having its inner wall 14 fairly steep so that the tumbler will be retained satisfactorily on the inclined retaining peg provided by some machines. This is in accordance with my prior Patent No. 1,754,560 which was directed particularly to the combination of a mixing machine with a glass tumbler as thus far described, pointing out the use of the glass tumbler completely avoided all short circuit hazard which had previously been present in the use of metal tumblers, enable the operator to observe the progress of the mixing, and insured cleanliness because dirt would be visible.

As also disclosed in my prior patent, the mixing tumbler was provided with a plurality of closely spaced relatively sharp ribs 16 in the gripping zone to prevent slippage of the glass from the hand. The greatest danger of slippage is the danger that when the glass is wet and soapy, it will be gripped slightly off center and will slip laterally from the fingers. The ribs safely overcome this danger. The natural taper of the glass tends to prevent its slipping downwardly through the fingers, but according to the present invention, an annular shoulder 17 is provided which is decidedly larger in diameter than the largest diameter of the glass shortly below this shoulder 17.

The present invention is concerned particularly with upstanding ribs 21 on the bottom of the glass and outstanding ribs 22 on the inside of the side of the glass. These ribs cooperate to retard rotation of the ingredients being mixed and thus permit filling the glass more completely without having the mixture wash over, and also speed up the mixing process.

As shown in Fig. 8, the conventional mixer includes a rotating shaft 23 at the bottom of which is positioned an agitator or impeller 24. Some mixers provide an additional agitator slightly above the one shown. Impeller 24 rotates at high speed and rotates the ingredients being mixed at high speed likewise. The speed of rotation is greatest in the immediate vicinity of the impeller 24 and hence the ingredients are thrown out by centrifugal force against the side wall 26. Because of the inclination of the side wall, the centrifugal force tends to cause the ingredients to be raised upwardly along the side walls. This produces a very desirable circulating tendency, the material at the center being drawn down to the impeller so that all the material above the impeller is thus brought into contact repeatedly with the impeller. The impeller is corrugated so that as the ice cream comes in contact with it, bits of the ice cream will be chewed off.

This same centrifugal force which tends to cause the liquid to circulate would also cause the liquid to wash over the top edge of the glass if it were not restrained. According to the present invention however, it is very effectively restrained by the ribs 22. In the preferred form of the invention these ribs extend all around the glass and are closely spaced. Furthermore, the ribs are very prominent near the top of the glass projecting $\frac{5}{32}$ or $\frac{3}{16}$ inch, and hence are very effective at this point in retarding the rotation and thereby reducing the centrifugal force. At the same time the ribs 22 taper off so that at the position of the impeller or agitator 24, the walls are substantially smooth. This insures adequate circulation of the ingredients above the agitator.

Not only do the ribs 22 retard rotation of the upper part of the mixture, but they also aid in breaking up the ice cream. As the ice cream rotates against these ribs, it is chewed up somewhat. The side walls of the ribs are preferably a little more pronouncedly radial than the draftsman has illustrated. Perhaps even more important is the fact that by slowing down the rotation of the mixture at this point, the bite of the agitator 24 on the ice cream as it drops down to the agitator near the center of the tumbler is increased. Thus, the ribs 22 not only chew up the ice cream, but also increase the chewing action of the agitator 24.

Since the slowest part of the mixture to be thoroughly chewed up and mixed heretofore has often been below the agitator 24, it is obvious that the provision of the ribs 22 would not always reduce the total mixing time. It was necessary therefore to find some way to reduce the mixing time for the part of the mixture below the impeller 24. This has been accomplished by providing the upstanding ribs 21. If the ingredients below the impeller 24 should rotate with the impeller at sufficiently high speed that they were not effectively chewed up by it, they would be chewed up by the cross-shaped ribs 21 on the bottom of the glass. Furthermore the slanting sides of these ribs will deflect the rotating liquid so that solid ingredients are thrust up against agitator 24 and are quickly chewed up by it.

One of the advantages of the glass tumbler is in keeping the drink cold a longer time. This is especially true if the tumbler is pre-chilled, since, as is well known, glass holds a large quantity of heat. Furthermore, glass is a better insulator of heat than metal and hence the glass will not only absorb a lot of heat from the surrounding air without passing it on to the drink, but even after it has absorbed the full capacity of heat under the circumstances, additional heat will be transmitted to the drink relatively slowly. In order to increase the insulating and chilling of the glass and also to facilitate manufacture, the minimum thickness of the walls is preferably increased from approximately the tops of the ribs 22 downwardly as seen in Fig. 9. Since the tumbler may be used for an individual serving glass, a fairly thin wall at and near the upper edge of the glass is preferred for the sake of both attractiveness of appearance and a more desirable feel to the lips.

I claim:

1. A mixing tumbler adapted for mixing drinks, having a series of generally vertical ribs closely spaced around an upper portion of the inside wall thereof to retard the rotation of the ingredients in the upper part of the tumbler and speed up the treatment of said ingredients by a rotating agitator and having upwardly projecting ribs on the bottom to retard the ingredients below the agitator and deflect them toward the agitator.

2. A mixing tumbler adapted for mixing drinks, including bottom and side walls and having a plurality of rigid ribs extending inwardly on the side walls with the sides of the ribs curving smoothly from the side walls and being prominent near the top of the tumbler and tapering to merge with the side wall above the bottom thereof, said ribs near the inner edges thereof being narrow to have a high abrasive effect on solids rotating against the ribs.

3. A mixing tumbler adapted for mixing drinks, including bottom and side walls and having a plurality of rigid ribs extending inwardly on the side walls with the sides of the ribs curving smoothly from the side walls and being prominent near the top of the tumbler and tapering to merge with the side wall above the bottom thereof, said ribs near the inner edges thereof having their sides approximately radial to have a high abrasive effect on solids rotating against the ribs.

4. A combination of a high speed rotary agitator adapted for mixing drinks and a mixing tumbler surrounding the agitator with its bottom near the agitator, said tumbler including upwardly extending ribs projecting inwardly from the side walls above the agitator with gradually progressively greater projection upwardly and having ribs projecting upwardly from the bottom.

5. A mixing tumbler adapted for mixing drinks, having a bottom and having side portions extending upwardly from the periphery of the bottom and having ribs upstanding from the bottom to strike the ingredients swirling adjacent the bottom, said ribs being substantially spaced from all parts of the side portions of the tumbler to render the entire bottom accessible for facilitating cleaning.

6. A molded integral mixing tumbler adapted to cooperate with a rotary agitator extending downwardly thereinto to a position close to the bottom thereof for mixing drinks, including bottom and side walls, said side wall having a plurality of rigid closely spaced ribs extending inwardly therefrom with the sides of the ribs curving smoothly from the side wall and with the ribs prominent near the top of the tumbler and gradually tapering in height along a substantial portion of their length to merge with the side wall above the bottom thereof to afford substantially less opposition to the swirling of liquid near the bottom than at the upper portion of the tumbler, said ribs near the inner edges thereof being narrow and steep-sided in cross section to have a high abrasive effect on solids rotating against the ribs, and a high retarding effect on the upper swirling liquids.

7. A molded integral mixing tumbler adapted to cooperate with a rotary agitator extending downwardly thereinto to a position close to the bottom thereof for mixing drinks, including bottom and side walls, said side wall having a plurality of rigid closely spaced ribs extending inwardly therefrom with the sides of the ribs curving smoothly from the side wall and with the ribs prominent near the top of the tumbler and gradually tapering in height along a substantial portion of their length to merge with the side wall above the bottom thereof to afford substantially less opposition to the swirling of liquid near the bottom than at the upper portion of the tumbler, said ribs near the inner edges thereof being narrow and steep-sided in cross section to have a high abrasive effect on solids rotating against the ribs, and a high retarding effect on the upper swirling liquids, and having ribs integral with the bottom wall, spaced from the side wall and having their sides facing partly upwardly to facilitate cleaning and to form inclined surfaces for directing the material below the agitator and rotated by it upwardly against the agitator whereby any solids therein will be cut up by the agitator and thoroughly mixed throughout the contents of the tumbler.

8. A molded integral mixing tumbler adapted to cooperate with a rotary agitator extending downwardly thereinto to a position close to the bottom thereof for mixing drinks, including bottom and side walls, and having ribs integral with the bottom wall, spaced from the side wall and having their sides facing partly upwardly to facilitate cleaning and to form inclined surfaces for directing the material below the agitator and rotated by it upwardly against the agitator whereby any solids therein will be cut up by the agitator and thoroughly mixed throughout the contents of the tumbler.

9. A molded integral mixing tumbler adapted to cooperate with a rotary agitator extending downwardly thereinto to a position close to the bottom thereof for mixing drinks, including bottom and side walls, said side wall having at least twelve ribs extending inwardly therefrom with the ribs prominent near the top of the tumbler and gradually tapering in height along a substantial portion of their length to merge with the side wall above the bottom thereof to afford substantially less opposition to the swirling of liquid near the bottom than at the upper portion of the tumbler whereby the mass may be rotated fast enough to ensure the formation of a vortex even though the upper portion is retarded enough to prevent slopping over when the tumbler is relatively full.

JULIUS H. KARLSON.